United States Patent [19]
Beardmore

[11] 3,747,417
[45] July 24, 1973

[54] GYROSCOPES INCLUDING GAS LUBRICATED BEARINGS

[75] Inventor: Geoffrey Beardmore, Cheltenham, England

[73] Assignee: Smiths Industries Limited, London, England

[22] Filed: June 3, 1971

[21] Appl. No.: 149,642

Related U.S. Application Data

[62] Division of Ser. No. 36,655, May 12, 1970.

[30] Foreign Application Priority Data

| May 14, 1969 | Great Britain | 24,634/69 |
| May 14, 1969 | Great Britain | 24,635/69 |
| May 14, 1969 | Great Britain | 24,636/69 |

[52] U.S. Cl. .................................. 74/5 R, 74/5.7
[51] Int. Cl. ............................................ G01c 19/20
[58] Field of Search ........................ 74/5, 5.7; 308/DIG. 19, DIG. 1

[56] References Cited
UNITED STATES PATENTS

| 2,857,534 | 10/1958 | Beach | 74/5.7 X |
| 3,482,454 | 12/1969 | Speen et al. | 74/5 |
| 3,358,514 | 12/1967 | Hauf et al. | 74/5.7 |
| 3,362,231 | 1/1968 | Baldwin et al. | 74/5 |
| 3,606,793 | 9/1971 | Johnston | 74/5.7 |

FOREIGN PATENTS OR APPLICATIONS

| 961,285 | 6/1964 | Great Britain | 74/5 |
| 499,767 | 1/1939 | Great Britain | 308/DIG. M |

Primary Examiner—Manuel A. Antonakas
Attorney—William D. Hall, Elliott I. Pollock et al.

[57] ABSTRACT

A rate gyroscope has a gimbal frame that is divided into two parts that are clamped to opposite ends of the journal assembly of a self-acting gas-lubricated bearing supporting the electrically-driven gyroscope-rotor of tungsten carbide. The journal assembly includes a boron-carbide shaft that is embraced by the annular rotor and extends across the frame as a rigid strut with boron-carbide bearing thrust-plates clamped to its two ends within the frame. The electrically-wound armature-ring of the rotor-motor is retained and located on the frame by the two frame-parts clamped to bear on its rim. The boron-carbide material may be replaced by silicon carbide.

16 Claims, 5 Drawing Figures

Geoffrey Beardmore
Inventor
by Hall, Pollock & Vande Sande
Attorneys

PATENTED JUL 24 1973 3,747,417

Geoffrey Beardmore
Inventor by Hall, Pollock of Vande Vande
Attorneys

GYROSCOPES INCLUDING GAS LUBRICATED BEARINGS

CROSS REFERENCE TO RELATED APPLICATION

The instant application is a division of prior copending application Ser. No. 36,655 filed May 12, 1970, for "Gas-Lubricated Bearings".

BACKGROUND OF THE INVENTION

This invention relates to gyroscopes including gas-lubricated bearings.

Various forms of gas-lubricated bearing have been the subject of practical and experimental investigation, but one, the self-acting or aerodynamic form, is finding increasing practical application in gyroscopes and other precision instruments. This form of gas-lubricated bearing involves the generation by virtue of rotation between two parts of the bearing, of a gas-pressure that acts to support one of the parts clear of the other. The pressure results from the viscous shearing that takes place in the gas between the two bearing-parts as a consequence of their relative rotation.

The opposed surfaces of the two bearing-parts need to be resistant to wear and other damage arising from contact between them when there is no relative rotation, and from the rubbing of one upon the other when rotation begins. This requirement for resistance to wear and other damage implies a characteristic of hardness and, although much research has been carried out using materials that are well known in engineering to have this characteristic, there is the difficulty that none of these has been found to be entirely satisfactory in itself. My copending application Ser. No. 36,655 is concerned with the provision of a gas-lubricated bearing that overcomes this difficulty.

SUMMARY OF THE INVENTION

With regard to this, my copending application Ser. No. 36,655 provides in one aspect a gas-lubricated bearing in which at least one of the two opposed surfaces of the bearing is of boron carbide or silicon carbide. The present invention in one aspect is concerned with the application of such a bearing to gyroscopes.

It has been found that both boron carbide and silicon carbide are well-suited to use in gas-lubricated bearings, boron carbide especially so. Both materials in addition to being very hard have an extremely good resistance to both corrosion and wear. Furthermore they both have a low density and and a good thermal conductivity, factors that are significant where, as is usual in precision instruments, overall mass and temperature effects are important.

One, or both, of the bearing-surfaces may be provided by an individual bearing-part that is composed wholly of boron carbide or silicon carbide. Alternatively the surface may be provided by a layer of boron carbide or silicon carbide deposited, or otherwise formed, on a substrate of some other material.

Although both bearing-surfaces may be formed of boron carbide or silicon carbide, or one of boron carbide and the other of silicon carbide, it may be found preferable in certain circumstances to form one of another material, for example of another carbide. In particular and according to an important feature of the present invention the other material may be tungsten carbide.

It has been found that tungsten carbide has characteristics that are well-matched to those of both boron carbide and silicon carbide for the purposes of gas-lubricated bearings. In particular the coefficient of thermal expansion of tungsten carbide is generally within one to two parts in a million of the corresponding coefficients of boron carbide and silicon carbide. There is in addition, however, the fact that the density of tungsten carbide is high whereas that of both boron carbide and silicon carbide is low, and this makes the gas-lubricated bearing of the present invention of especial advantage where, as with gyroscopes, considerations of mass and inertia are of importance. The gas-lubricated bearing of the invention is in the latter respect of especial advantage for the rotational mounting of the rotor of a gyroscope, not only because of the advantageous characteristics of the gas-lubricated bearing as such, but also because it enables somewhat conflicting requirements as to high rotor-inertia and low overall gyroscope-mass to be met. In particular it may be arranged that in the mounting of the rotor on a gimbal structure of the gyroscope the bearing-surface of tungsten carbide is carried with the rotor, whereas the bearing-surface of the material, boron carbide or silicon carbide, of lower density is carried with the gimbal structure; this enables the mass, and consequently the inertia, of the rotor to be maximized, while at the same time enabling the mass of the gimbal structure, and therefore that part of the overall gyroscope-mass that does not contribute to operational efficiency, to be minimized.

The present invention, while concerned in one aspect with specific materials and material-combinations applicable to a gas-lubricated bearing in a gyroscope, is also concerned with the manner in which a gas-lubricated bearing arrangement can be adapted to the rotatable mounting of a gyroscope-rotor on its gimbal frame. Various proposals have already been made for such mounting, but these have in general suffered from the disadvantage that the accommodation of the gas-lubricated bearing arrangement has required an increase in width of the gimbal frame, or a decrease in size of the rotor, as compared with what would be possible using a more conventional bearing arrangement. Increase in frame-width has the disadvantage of adding considerably to the mass and overall bulk of the gyroscope, whereas decrease in size of the rotor is also of disadvantage in tending to reduce the sensitivity of operation. It is therefore, another object of the present invention to overcome these disadvantages.

In relation to this object and according to another aspect of the invention the bearing arrangement of the gyroscope-rotor includes a rigid journal-part that extends across the gimbal frame and is embraced by the rotor-part, and the frame is formed by separate frame-parts that are individually clamped to the journal-part so that this journal-part acts effectively as a strut contributing significant rigidity to the frame.

It is conventional practice to provide the rotor-carrying gimbal-frame of a gyroscope as a substantial and solid structure so that the frame responds with inherent rigidity to precession torque applied from the rotor, and, as mentioned above, the accommodation of a gas-lubricated bearing arrangement for the rotor-mounting normally implies either an increase in width of the frame itself or a decrease in size of the rotor, or both. Increase in frame-width in these circumstances has the disadvantage of adding considerably to the mass and overall bulk of the gyroscope, whereas decrease in size of the rotor acts, by reducing its effective moment of inertia, to reduce the sensitivity of the gyroscope and with it the natural frequency of the gimbal structure about the precession axis. With the form of gyroscope according to the present invention referred to in the preceding paragraph, it is possible to make use of a lighter construction of gimbal frame than otherwise, rigidity being contributed to the frame by the journal-part and not being a necessity of the structure of the frame itself. In this the invention enables the gas-lubricated bearing arrangement to be readily accommodated in the gyroscope with significant saving in mass and overall bulk and with enhanced sensitivity and increase in natural frequency.

The efficient operation of the gas-lubricated bearing arrangement is dependent upon accuracy in the opposed bearing-parts and their location with respect to one another. This accuracy is readily achievable using the separate frame-parts clamped individually to the journal-part of the gas-lubricated bearing arrangement, since this enables the bearing arrangement to be set up as desired, and the dimensioning and location of the remaining elements of the gimbal assembly to be related directly to this rather than vice versa.

The journal-part may be a shaft that is embraced by the rotor-part, inner and outer cylindrical surfaces of the rotor-part and shaft respectively, providing opposed bearing-surfaces of the gas-lubricated bearing arrangement such that rotation of the rotor-part generates gas-pressure between these two surfaces to support the rotor-part clear of the shaft. The surface of the shaft may be provided with grooves to enhance, and stabilize, the support provided in the latter respect, and in accordance with the earlier-discussed aspect of the invention the shaft may advantageously be of boron carbide, or silicon carbide, and the rotor-part of tungsten carbide. Furthermore, the gas-lubricated bearing arrangement may include two thrust-members, both of which may be grooved, that are, for example, clamped to opposite ends of the shaft within the frame, these thrust-members having flat faces that oppose respectively flat faces at either end of the rotor-part such that rotation of the rotor-part generates gas-pressure between each of the pair of opposed faces to support the rotor-part clear of the thrust-members.

Although emphasis has been given in the preceding paragraph and elsewhere, to gas-lubricated bearings of the self-acting, aerodynamic form, where supporting gas-pressure is generated by virtue of the relative rotation between the opposed bearing-surfaces, the invention is not in its general context confined to this particular form. It may be used equally-well where gas-pressure is supplied in full or in part from an external source (full- or partial-aerostatic form), or where a squeeze-film is involved.

BRIEF DESCRIPTION OF THE DRAWINGS

A rate gyroscope that includes a gas-lubricated bearing, all in accordance with the present invention, will now be described, by way of example, with reference to the accompanying drawings, in which.

DESCRIPTION OF THE PREFERRED EMBODIMENTS

Figure 1:
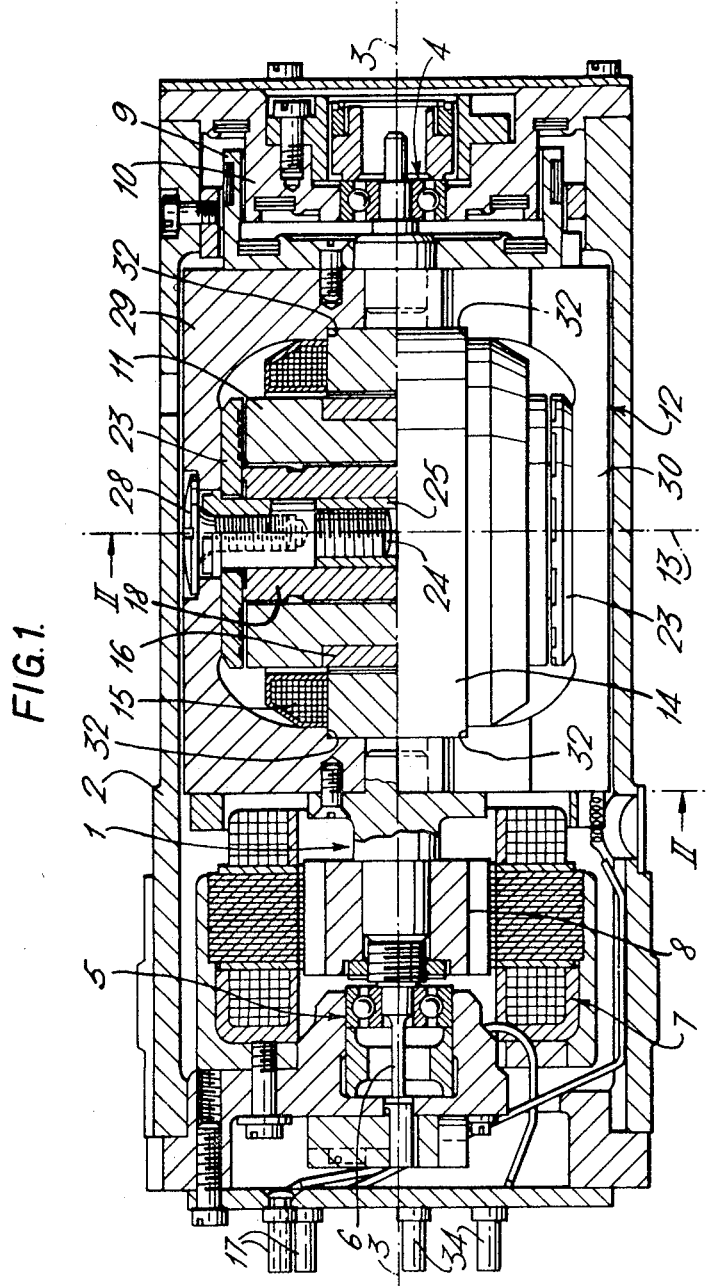
FIG. 1 is a sectional side-elevation of the rate gyroscope.

Referring to FIG. 1, a gimbal structure 1 of the rate gyroscope is mounted within a cylindrical casing 2 for angular displacement about an axis 3 collinear with the longitudinal axis of the casing 2. The casing 2, which is hermetically-sealed by an outer, enveloping case not shown in the drawings, is in the present instance filled with dry air, but may alternatively be filled with helium or nitrogen.

The gimbal structure 1 is mounted on the axis 3 by means of ball bearings 4 and 5 positioned towards opposite ends of the casing 2, and is coupled to the casing 2 adjacent the bearing 5 through a torsion bar 6 that provides a resilient restraint opposing angular displacement of the structure 1 about the axis 3. An electromagnetic pick-off comprising an electromagnetic stator 7 carried by the casing 2 and a ferromagnetic rotor 8 carried by the structure 1, is arranged to be excited with alternating electric current so as to derive a signal dependent upon any angular displacement of the structure 1 about the axis 3. Damping of the movement of the gimbal structure 1 about the axis 3 is provided by a viscous-damping device that is formed by two coaxial and closely-spaced cylindrical shells 9 and 10 that are carried respectively by the structure 1 and casing 2, with liquid trapped in the annular space between them. The construction and action of this form of damping device is described in detail in U.S. Pat. No. 3,156,121, issued Nov. 10, 1964, in the name of W. R. Simons.

Referring now also to the other figures, an annular, tungsten-carbide rotor 11 of the gyroscope is carried within a rectangular gimbal-frame 12 of the structure 1 for rotation about an axis 13 that is perpendicular to the axis 3. Drive to rotate the rotor 11 about the axis 13 is provided by an electrical three-phase hysteresis motor. An armature ring 14 forming the stator of this motor, carries three-phase electrical windings 15 and is mounted in the frame 12 to embrace the rotor 11. The rotor 11 itself provides the rotor of the hysteresis motor and where it lies within the armature ring 14 is in this respect inset around its outer circumference with a driving band 16 of tungsten steel. Energization of the motor to drive the rotor 11 about the axis 13 is effected via electrical leads that interconnect the windings 15 with electrical connectors 17 mounted externally of the casing 2.

Figure 2:
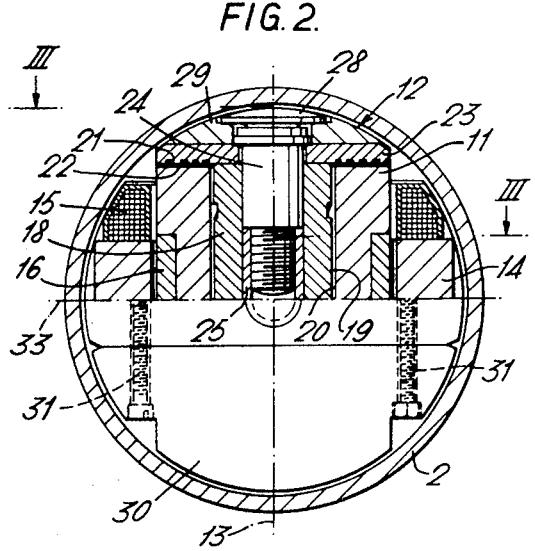
FIGS. 2 and 3 are respectively a sectional end-view and a sectional plan showing a gimbal assembly involved in the gas-lubricated bearing arrangement of the rate gyroscope, the section of FIG. 2 being taken on the line II—II of FIG. 1, and that of FIG. 3 on the line III—III of FIG. 2.
Figure 3:
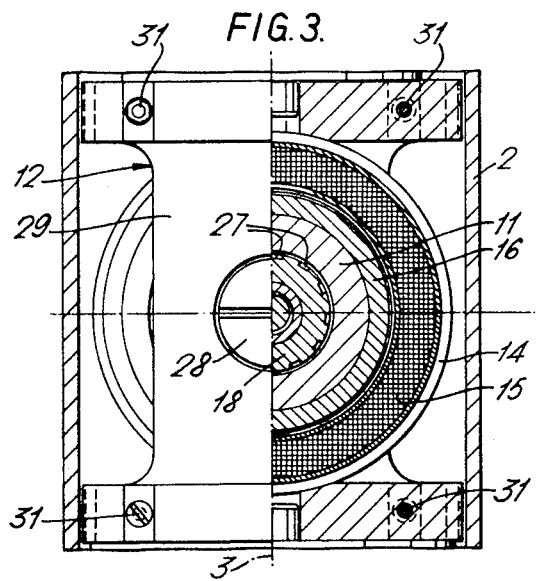

The rotor 11 is mounted within the frame 12 by an aerodynamic air-lubricated bearing arrangement, and embraces a hollow, but rigid, journal shaft 18 of boron carbide that forms part of this arrangement. As indicated specifically in FIG. 2, the cylindrical surface 19 of the shaft 18 is of smaller diameter than the inner cylindrical surface 20 of the rotor 11, leaving a small air-gap between them. This small air-gap is continued outwardly across both flat, annular end-faces 21 of the rotor 11, where the faces 21 are opposed by the flat faces 22 of two circular boron-carbide thrust-plates 23 clamped to either end of the shaft 18. The thrust-plates 23, with their faces 22 normal to the shaft 18, are clamped to either end by collared-studs 24 that are screwed into an internally-threaded bush 25 bonded within the hollow shaft 18.

Figure 4:
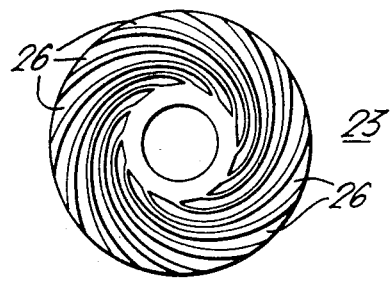
FIG. 4 is a plan view of one of two grooved thrust-plates that form part of the gas-lubricated bearing.
Figure 5:
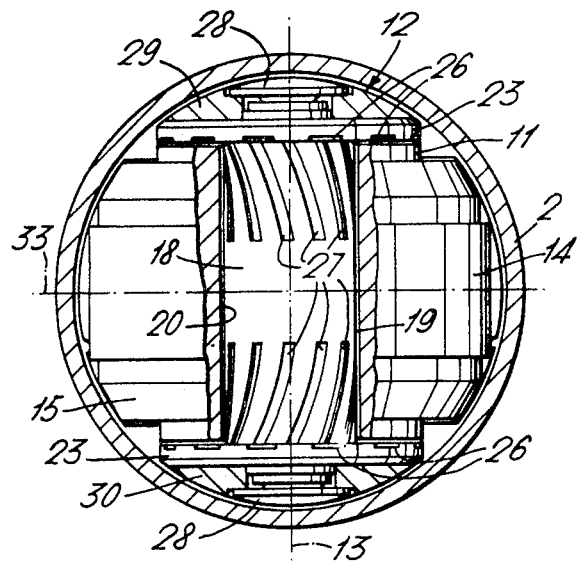
FIG. 5 is a sectional end-elevation of the rate gyroscope, providing an external view of the gimbal assembly broken away to show a grooved shaft that forms another part of the gas-lubricated bearing.

The face 22 of each thrust-plate 23, like the cylindrical surface 19 of the shaft 18, is spirally-grooved to enhance, and stabilize, the aerodynamic generation of a supporting air-pressure between the opposed bearing-surfaces. Each face 22, as shown more clearly in FIG. 4, is provided with a series of twelve shallow grooves 26 that are of a logarithmic-spiral pattern and extend inwardly from the outer edge of the respective thrust-plate 23 to a central land. The surface 19 of the shaft 18 on the other hand, and as shown clearly in FIG. 5, is provided over one-third of its length at either end with a series of twelve shallow grooves 27 that are of herringbone pattern distributed around the circumference of the shaft 18.

The shaft 18 defines the rotational- or spin-axis 13 of the rotor 11, and with the two thrust-plates 23 clamped rigidly to its two ends by the studs 24, forms the complete journal assembly of the rotor-bearing arrangement. The gimbal-frame 12 is clamped firmly to this journal assembly by means of two bolts 28 that are screwed into the internally-threaded studs 24. In this respect the gimbal-frame 12 is divided parallel to the axis 3, being formed of two unequal aluminum parts 29 and 30 of U-shape that are respectively clamped to opposite ends of the journal assembly from one another by the bolts 28. The two side-limbs of the U-shaped part 29 extend towards and abut end-to-end the side-limbs respectively of the U-shaped part 30, and the two parts 29 and 30 as individually clamped to the journal assembly are also clamped together where they abut in this way, by two pairs of bolts 31 at either end of the frame 12. Each part 29 and 30 has an internal shoulder 32 (see FIG. 1) that abuts directly the rim of the ring 14, so that the two parts 29 and 30 clamped hard on to the ring 14 by the bolts 31, hold this firmly in position within the frame 12.

The rate gyroscope functions to provide a measure of the rate of any angular movement of the casing 2 about an axis 33 perpendicular to both axes 3 and 13. While the windings 15 of the motor-stator are energized to rotate the rotor 11 about the spin-axis 13, angular movement of the casing 2 about the axis 33 causes precession torque to be applied to the gimbal structure 1 about the axis 3. Precession of the structure 1 about the axis 3 is opposed resiliently by the torsion bar 6 so that the resultant angular displacement about the precession axis 3 is in accordance with angular velocity about the input axis 33. A measure of this angular velocity is accordingly provided by the electric signal derived in the stator 7 of the electromagnetic pick-off and supplied via electrical leads to electrical connectors 34 mounted externally of the casing 2.

The rotational drive applied to the rotor 11 about the spin axis 13 is in the sense to cause the rotor 11 to drag air inwardly along both the grooves 27 of the shaft 18 and the grooves 26 of the thrust-plates 23. The air-pressure that is in consequence generated between the opposed bearing-surfaces 19 and 20 and between the two pairs of bearing-surfaces 21 and 22, acts to support the rotor 11 clear of the shaft 18 radially, and clear of the two thrust-plates 23 axially. The clearance involved between the opposed bearing-surfaces is in each case of only a few tenths of a thousandth of an inch.

Maintenance of the balance involved in the support of the rotor 11 throughout any period of operation of the rate gyroscope, and following repeated breaks in operation during the life of the rate gyroscope, is dependent upon matching of the materials of the opposed bearing-surfaces to one another. It is also dependent upon their resistance to corrosion and to the wear and other damage that arises from contact between them during breaks in operation and the inevitable rubbing of one surface upon the other when rotation is started up. The materials used in the present example, boron carbide and tungsten carbide, have been found to be very well matched to one another in all these respects. Both materials are very hard, boron carbide being particularly so (a hardness of some 3,000 Vickers Diamond-Pyramid Hardness) and having an exceptionally good resistance to wear and corrosion; tungsten carbide although not so hard (some 1,700 Vickers Diamond-Pyramid Hardness) has very good resistance to both wear and corrosion. Each has a high melting point and good heat conductivity, and their coefficients of thermal expansion, $5.8 \times 10^{-6}$ per degree Centigrade for boron carbide and $4.88 \times 10^{-6}$ per degree Centigrade for tungsten carbide, are well matched to ensure that differential expansion of the opposed bearing-surfaces has insignificant effect upon operation of the bearing.

The shaft 18 and thrust-plates 23 are machined using conventional techniques, from virtually pure boron carbide provided in hot-pressed form. The rotor 11 is likewise machined from tungsten carbide provided in a sintered form containing some 3 percent cobalt. The surfaces 19 to 22 are machined to a surface-finish less than 1 micro-inch C.L.A. (center-line average), with the accuracy of roundness of the surfaces 19 and 20 to less than 5 micro-inches and the accuracy of flatness of the surfaces 21 and 22 to less than 10 micro-inches (one light-band). The accurate grooving of the plates 23 and shaft 18 is provided using the ionic machining method described in our co-pending U.S. Pat. application Ser. No. 9,728, filed Feb. 9, 1970, now abandoned and replaced by continuation application Ser. No. 270,414, filed July 10, 1972, in the name of the present applicant and H. N. Evans. In this method, pre-machined and appropriately-masked blanks of the plates 23 and shaft 18 are bombarded by ions to effect removal of material therefrom and leave the grooves 26 and 27.

The material-combination of boron carbide with tungsten carbide for the air-lubricated bearing arrangement in the rate gyroscope has advantages apart from those of matching discussed above. In particular the use of tungsten carbide for the rotor 11 is of advantage in that this material has a high density, namely 14.97 grammes per cubic centimetre, and therefore enables a high rotor-inertia to be obtained. Boron carbide, in contrast to tungsten carbide, has a low density, namely 2.51 grammes per cubic centimetre, and this too is of advantage in that the non-rotational parts forming the journal assembly of the bearing arrangement, the shaft 18 and thrust-plates 23, contribute little to the mass of the gimbal structure 1 and gyroscope as a whole.

The general construction of the gimbal structure 1, with the gimbal-frame 12 divided into separate parts 29 and 30 clamped to opposite ends of the journal assembly, assists also in the reduction of overall mass. The shaft 18 extending across the frame 12 acts effectively as a strut and as such contributes significant rigidity to the frame 12; this use of the rigidity of the shaft 18 enables the frame 12 to be provided in a lighter constructional-form than otherwise would be the case. Furthermore, there is the advantage that the clamping of the separate frame-parts 29 and 30 to the journal assembly of the shaft 18 and thrust-plates 23, ensures that the dimensioning and location of the parts of the gimbal structure are accurately and directly related to the journal assembly itself, rather than vice versa. This enables parts, such as the armature ring 14, to be very accurately located with respect to the journal assembly, and therefore with respect to the rotor 11, without the need for special locating-dowels and spigots; the ring 14 is accurately located and retained with respect to the rotor 11 in the present instance merely by its abutment with the shoulders 32 of the parts 29 and 30.

In the above specific example consideration has been given only to the material-combination of boron carbide and tungsten carbide in the gas-lubricated bearing arrangement. Although the use of boron carbide in this connection is preferred, silicon carbide (density 3.1 grammes per cubic centimetre) may be used as an alternative. Silicon carbide is well-matched to tungsten carbide, being very hard (some 2,700 Vickers Diamond-Pyramid Hardness) and having in addition to a very good resistance to wear, an outstanding corrosion-resistance. The melting point of silicon carbide is almost as high as that of boron carbide (2,400 degrees Centigrade) and its coefficient of thermal expansion, namely $3.24 \times 10^{-6}$ per degree Centigrade, is not significantly different from that of boron carbide.

Although the use of tungsten carbide is, as explained above, of particular advantage where high inertia is required, the gas-lubricated bearing of the present invention may involve solely boron carbide or silicon carbide, or a combination of these two materials for the bearing-surfaces.

The present invention as well as being applicable to the provision of a gas-lubricated bearing of the 'H' configuration (as exemplified above by the bearing arrangement involving the journal shaft 18 and the thrust-plates 23 at either end) is applicable to other configurations of bearing; in particular it is applicable to gas-lubricated bearings of the spherical, twin-hemispherical, and conical forms.

I claim:

1. A gyroscope comprising a gimbal structure, a rotor, and gas-lubricated bearing means rotatably mounting the rotor on the gimbal structure, and wherein said gas-lubricated bearing means comprises a first part carried with said gimbal structure to provide a first bearing-surface wholly of boron carbide, and a second part carried with said rotor to provide a second bearing-surface, said second bearing-surface opposing said first bearing-surface with a space therebetween for gas-support of the rotating rotor clear of the first bearing-surface.

2. A gyroscope according to claim 1 wherein said second part is wholly tungsten carbide.

3. A gyroscope according to claim 1 wherein said first part is a journal shaft and said second part is an annular rotor-part embracing the journal shaft.

4. A gyroscope according to claim 3 wherein said annular rotor-part has flat annular end-faces, and wherein the gyroscope includes two thrust-members carried by the journal shaft, said thrust-members having flat faces that oppose respectively the flat end-faces of the rotor-part with space therebetween for gas-support of the rotating rotor clear of the thrust-members.

5. A gyroscope according to claim 4 wherein said rotor-part is of tungsten carbide, and wherein said journal shaft and said thrust-members are all of boron carbide.

6. A gyroscope according to claim 5 wherein the flat face of each thrust-member has grooves therein to enhance aerodynamic generation of gas-pressure at that face when the rotor is rotating.

7. A gyroscope according to claim 6 wherein the journal shaft is grooved to enhance aerodynamic generation of gas-pressure between the shaft and the rotating rotor.

8. A gyroscope according to claim 1 wherein said second bearing surface is of tungsten carbide.

9. A gyroscope comprising a gimbal structure, a rotor, and gas-lubricated bearing means rotatably mounting the rotor on the gimbal structure, and wherein said gas-lubricated bearing means comprises a first part carried with said gimbal structure to provide a first bearing-surface wholly of silicon carbide, and a second part carried with said rotor to provide a second bearing-surface, said second bearing-surface opposing said first bearing-surface with a space therebetween for gas-support of the rotating rotor clear of the first bearing-surface.

10. A gyroscope according to claim 9 wherein said second part is wholly tungsten carbide.

11. A gyroscope according to claim 9 wherein said first part is a journal shaft and said second part is an annular rotor-part embracing the journal shaft.

12. A gyroscope according to claim 11 wherein said annular rotor-part has flat annular end-faces, and wherein the gyroscope includes two thrust-members carried by the journal shaft, said thrust-members having flat faces that oppose respectively the flat end-faces of the rotor-part with space therebetween for gas-support of the rotating rotor clear of the thrust-members.

13. A gyroscope according to claim 12 wherein said rotor-part is of tungsten carbide, and wherein said journal shaft and said thrust-members are all of silicon carbide.

14. A gyroscope according to claim 13 wherein the flat face of each thrust-member has grooves therein to enhance aerodynamic generation of gas-pressure at that face when the rotor is rotating.

15. A gyroscope according to claim 14 wherein the journal shaft is grooved to enhance aerodynamic generation of gas-pressure between the shaft and the rotating rotor.

16. A gyroscope according to claim 9 wherein said second bearing surface is of tungsten carbide.

* * * * *